United States Patent
Kennedy et al.

(10) Patent No.: US 11,870,745 B1
(45) Date of Patent: Jan. 9, 2024

(54) MEDIA GALLERY SHARING AND MANAGEMENT

(71) Applicant: Snap Inc., Santa Monica, CA (US)

(72) Inventors: David James Kennedy, Toronto (CA); Diego Muñoz Escalante, Toronto (CA); Arianne Spool, New York, NY (US); Yinghua David Xia, Toronto (CA)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/852,163

(22) Filed: Jun. 28, 2022

(51) Int. Cl.
| | |
|---|---|
| *G06F 3/0482* | (2013.01) |
| *H04L 51/10* | (2022.01) |
| *H04L 67/146* | (2022.01) |
| *G06F 3/0484* | (2022.01) |
| *G06F 3/04817* | (2022.01) |

(52) U.S. Cl.
CPC ............ *H04L 51/10* (2013.01); *G06F 3/0482* (2013.01); *G06F 3/0484* (2013.01); *H04L 67/146* (2013.01); *G06F 3/04817* (2013.01)

(58) Field of Classification Search
CPC ................................................. G06F 3/048–05
See application file for complete search history.

(56) References Cited

U.S. PATENT DOCUMENTS

| | | | |
|---|---|---|---|
| 5,604,843 | A | 2/1997 | Shaw et al. |
| 5,689,559 | A | 11/1997 | Park |
| 5,880,731 | A | 3/1999 | Liles et al. |
| 6,023,270 | A | 2/2000 | Brush, II et al. |
| RE36,919 | E | 10/2000 | Park |
| RE37,052 | E | 2/2001 | Park |
| 6,223,165 | B1 | 4/2001 | Lauffer |
| 6,650,793 | B1 | 11/2003 | Lund et al. |
| 6,772,195 | B1 | 8/2004 | Hatlelid et al. |
| 6,804,417 | B1 | 10/2004 | Lund et al. |
| 6,842,779 | B1 | 1/2005 | Nishizawa |
| 7,342,587 | B2 | 3/2008 | Danzig et al. |

(Continued)

FOREIGN PATENT DOCUMENTS

| | | |
|---|---|---|
| CN | 109863532 A | 6/2019 |
| CN | 110168478 A | 8/2019 |

(Continued)

OTHER PUBLICATIONS

"Bitmoji", Snapchat Support, [Online] Retrieved from the Internet: <URL: https://web.archive.org/web/20190503063620/https://support.snapchat.com/en-us/a/bitmoji>, (captured May 3, 2019), 2 pgs.

(Continued)

*Primary Examiner* — Daniel Rodriguez
(74) *Attorney, Agent, or Firm* — SCHWEGMAN LUNDBERG & WOESSNER, P.A.

(57) ABSTRACT

Various embodiments include systems, methods, and non-transitory computer-readable media for sharing and managing media galleries. Consistent with these embodiments, a method includes receiving a request from a first device to share a media gallery that includes a user avatar; generating metadata associated with the media gallery; generating a message associated with the media gallery, the message at least including the media gallery identifier and the identifier of the user avatar; and transmitting the message to a second device of the recipient user.

20 Claims, 12 Drawing Sheets

(56) References Cited

U.S. PATENT DOCUMENTS

| | | |
|---|---|---|
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,243,076 B2 * | 8/2012 | Goodinson ............ G06T 11/60 345/173 |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B2 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-Hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-hernández et al. |
| 11,284,144 B2 | 3/2022 | Kotsopoulos et al. |
| 11,507,796 B2 * | 11/2022 | Lee ................ G06T 13/40 |
| 11,592,960 B2 * | 2/2023 | Baszucki ............ A63F 13/537 |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |

(56) References Cited

U.S. PATENT DOCUMENTS

| | | | |
|---|---|---|---|
| 2009/0204510 A1* | 8/2009 | Hwang | G06Q 20/40 705/40 |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0203968 A1 | 8/2010 | Gill et al. | |
| 2010/0227682 A1 | 9/2010 | Reville et al. | |
| 2011/0093780 A1 | 4/2011 | Dunn | |
| 2011/0115798 A1 | 5/2011 | Nayar et al. | |
| 2011/0148864 A1 | 6/2011 | Lee et al. | |
| 2011/0239136 A1 | 9/2011 | Goldman et al. | |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2013/0103760 A1 | 4/2013 | Golding et al. | |
| 2013/0201187 A1 | 8/2013 | Tong et al. | |
| 2013/0249948 A1 | 9/2013 | Reitan | |
| 2013/0257877 A1 | 10/2013 | Davis | |
| 2014/0043329 A1 | 2/2014 | Wang et al. | |
| 2014/0055554 A1 | 2/2014 | Du et al. | |
| 2014/0125678 A1 | 5/2014 | Wang et al. | |
| 2014/0129343 A1 | 5/2014 | Finster et al. | |
| 2014/0129971 A1* | 5/2014 | King | G06Q 10/109 715/772 |
| 2015/0206349 A1 | 7/2015 | Rosenthal et al. | |
| 2016/0134840 A1 | 5/2016 | Mcculloch | |
| 2016/0234149 A1 | 8/2016 | Tsuda et al. | |
| 2017/0080346 A1 | 3/2017 | Abbas | |
| 2017/0087473 A1 | 3/2017 | Siegel et al. | |
| 2017/0113140 A1 | 4/2017 | Blackstock et al. | |
| 2017/0118145 A1 | 4/2017 | Aittoniemi et al. | |
| 2017/0199855 A1 | 7/2017 | Fishbeck | |
| 2017/0235848 A1 | 8/2017 | Van Dusen et al. | |
| 2017/0310934 A1 | 10/2017 | Du et al. | |
| 2017/0312634 A1 | 11/2017 | Ledoux et al. | |
| 2018/0047200 A1 | 2/2018 | O'hara et al. | |
| 2018/0113587 A1 | 4/2018 | Allen et al. | |
| 2018/0115503 A1 | 4/2018 | Baldwin et al. | |
| 2018/0198743 A1 | 7/2018 | Blackstock et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0057616 A1 | 2/2019 | Cohen et al. | |
| 2019/0097958 A1 | 3/2019 | Collet et al. | |
| 2019/0188920 A1 | 6/2019 | Mcphee et al. | |
| 2019/0280997 A1 | 9/2019 | Baldwin et al. | |
| 2020/0306637 A1 | 10/2020 | Baldwin et al. | |
| 2020/0372127 A1 | 11/2020 | Denton et al. | |
| 2020/0410575 A1 | 12/2020 | Grantham et al. | |
| 2021/0056376 A1* | 2/2021 | Panayiotou | G06K 19/0723 |
| 2021/0074047 A1 | 3/2021 | Sheth et al. | |
| 2021/0089179 A1 | 3/2021 | Grantham et al. | |
| 2021/0097745 A1* | 4/2021 | Monroy-Hernández | G06Q 50/01 |
| 2021/0104087 A1 | 4/2021 | Smith et al. | |
| 2021/0168108 A1 | 6/2021 | Antmen et al. | |
| 2021/0170270 A1 | 6/2021 | Brody et al. | |
| 2021/0192823 A1 | 6/2021 | Amitay et al. | |
| 2021/0209825 A1 | 7/2021 | Assouline et al. | |
| 2021/0225058 A1 | 7/2021 | Chand et al. | |
| 2021/0240315 A1 | 8/2021 | Alvi et al. | |
| 2021/0243482 A1 | 8/2021 | Baril et al. | |
| 2021/0243503 A1 | 8/2021 | Kotsopoulos et al. | |
| 2021/0266277 A1 | 8/2021 | Allen et al. | |
| 2021/0281897 A1 | 9/2021 | Brody et al. | |
| 2021/0285774 A1 | 9/2021 | Collins et al. | |
| 2021/0306290 A1 | 9/2021 | Voss | |
| 2021/0306451 A1 | 9/2021 | Heikkinen et al. | |
| 2021/0385180 A1 | 12/2021 | Al Majid et al. | |
| 2021/0405831 A1 | 12/2021 | Mourkogiannis et al. | |
| 2021/0409535 A1 | 12/2021 | Mourkogiannis et al. | |
| 2022/0012929 A1 | 1/2022 | Blackstock et al. | |
| 2022/0237841 A1* | 7/2022 | Spencer | G06N 20/00 |
| 2023/0245587 A1* | 8/2023 | Kheirabadi | G10L 15/22 434/178 |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-us/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Surprise!", [Online] Retrieved from the Internet: <URL: https://www.snap.com/en-US/news/post/surprise>, (Oct. 3, 2013), 1 pg.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launces Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

Etherington, Darrell, "Snapchat Gets Its Own Timeline With Snapchat Stories, 24-Hour Photo & Video Tales", [Online] Retrieved from the

(56) References Cited

OTHER PUBLICATIONS

Internet: <URL: https://techcrunch.com/2013/10/03/snpachat-gets-its-own-timeline-with-snapchat-stories-24-hour-photo-video-tales/>, (Oct. 3, 2013), 2 pgs.

Hamburger, Ellis, "Snapchat's next big thing: 'Stories'that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How to Add My Friend's Bitmoji to my Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How to Add Bitmoji to Customizable Geofilters", International Business Times, [Online] Retrieved from the Internet: <URL: https://www.ibtimes.com/snapchat-update-how-add-bitmojicustomizable-geofilters-2448152>, (Nov. 18, 2016), 6 pgs.

\* cited by examiner

MEDIA GALLERY SHARING AND MANAGEMENT

BACKGROUND

Electronic messaging, particularly instant messaging, continues to grow globally in popularity. Users are able to share media content items with one another, including text, electronic images, audio, and video. Some systems also generate personalized content for users. For example, systems may generate personalized stories that include a user's avatar and the avatar of additional users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
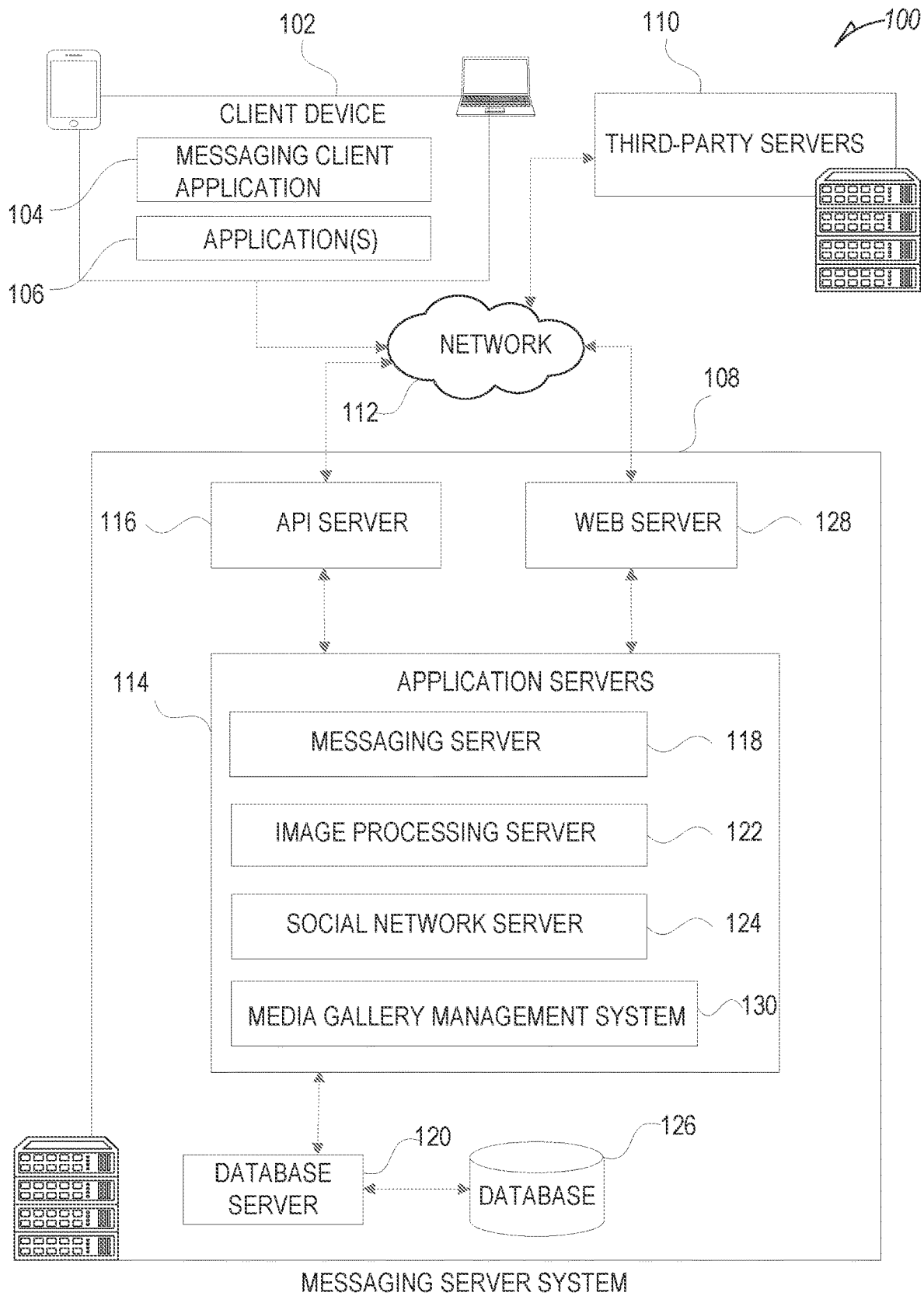
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various embodiments may be given throughout this description. These are merely descriptions of specific embodiments. The scope or meaning of the claims is not limited to the embodiments given.

Existing systems face challenges in allowing users to share collections of media content items (e.g., media galleries) with one another. Challenges also include matching the user avatars displayed in the shared media gallery with the user avatars displayed in the original media gallery at the time of sharing.

Various examples include systems, methods, and non-transitory computer-readable media for sharing and managing personalized media galleries. A media gallery, also referred to as a collection of media content items, may include collections of text, image videos, and audio data. A media gallery may also include one or more user avatars, and is referred to herein as an "avatar media gallery." A user avatar may correspond to (or resemble) a real person (e.g., a user) or a fictional character. Various custom appearances of a user avatar may be generated based on the real-time data, and/or user inputs (e.g., user-specific parameters that represent the physical appearance of a person or a character).

Various custom appearances of a user avatar may also be generated based on one or more media gallery templates (e.g., holiday-themed media gallery). For example, one or more user avatars may be used to populate a media gallery template to generate a customized media gallery, such as a video or comic strip, that includes selected avatars as portrayed characters within the video, comic strip, and the like. In many cases, the avatars selected to populate the media gallery template are selected based on the client device (e.g., smart phone, computer, etc.) that is generating the customized media gallery. For example, the avatar depicting a user associated withteh client device may be selected along with the avatars of one or more of the user's connections (e.g., friends).

As these customized media galleries are generated dynamically at the client device, issues arise if a user wishes to share the customized media gallery they are viewing with another user. For example, each client device will select different avatars to populate the media gallery template, resulting in different version of the customized media gallery being generated and presented at each client device. While static images of a generated customized media gallery could be captured and shared, generating these images may be time and resource intensive, while the size of these static images may also be too large to feasibly share among client devices.

To alleviate these issues, a media gallery management system provides avatar identifiers that correspond to the one or more avatars used to generate a customized media gallery to another client device when sharing a customized media gallery. The receiving client device can then use the received avatar identifiers to select the proper avatars and populate the media gallery template to generate a customized media gallery that includes the same avatars as were viewed on the client device that shared the customized media gallery. Through this process, the customized medial gallery is still dynamically generated at the receiving client device to maintain limited resource usage, but it also allows for sharing of the specific customized media gallery that was generated and presented at the sharing client device.

In various embodiments, in response to receiving a request to share a media gallery, a media gallery management system generates (or determines) one or more user avatar identifiers that correspond to the one or more user avatars in the original media gallery. The media gallery management system includes the one or more user avatar identifiers in metadata associated with the media gallery, and transmits the metadata of the media gallery along with the shared media gallery (via a uniform resource locator associated with the media gallery, for example) to a device of the recipient user. Thereby, when received by the recipient user's client device, the shared media gallery shows (or includes) the one or more user avatars that appear in the original media gallery at the time of the sharing.

In various embodiments, the default user avatars used to populate an avatar media gallery may include a user avatar representing a user of the displaying device and a user avatar representing a connected user (e.g., a friend) with whom the user most recently interacted. Such interactions may include transmitting messages, conducting video or audio calls, etc. Under the approach described in the disclosure, a recipient user may receive a shared media gallery that shows the same avatar(s) as what the sending user sees at the time of the sharing, as opposed to seeing the default user avatars (e.g., the recipient user's avatar and his or her mostly messaged friend's avatar) that would have applied to the recipient user's avatar media galleries.

Specifically, in various embodiments, the media gallery management system receives a request from a device (e.g., the first device, the sharing device) to share a media gallery that includes one or more user avatars. The media gallery management system generates a preview of the media gallery and metadata associated with the media gallery. The metadata associated with the media gallery includes an identifier of the media gallery and one or more identifiers of the one or more user avatars. The media gallery management system causes a display of a user interface on the first device. The user interface includes the preview of the media gallery, a plurality of recipient users for selection, a text input region, and one or more user-selectable icons that correspond to one or more third-party platforms. A user may share a media gallery on the one or more third-party platforms.

In various embodiments, in response to detecting a user selection of one or more recipient users and activation (e.g., via tapping or clicking) of a share button in the user interface, the media gallery management system fetches (or retrieves) data associated with the media gallery using the media gallery identifier. Data associated with the media gallery may be stored in a database communicatively coupled to the media gallery management system. The media gallery management system identifies a uniform resource locator (URL) associated with the media gallery based on the fetched data and/or the media gallery identifier.

In various embodiments, the media gallery management system generates a message associated with the media gallery. The message at least includes the identified URL and the metadata associated with the media gallery. The media gallery management system transmits the shared media gallery via the message to a device (e.g., the second device, the receiving device) of one or more recipient users.

In various embodiments, the media gallery management system causes the display of the preview of the media gallery that represents the message on the second device of the recipient user. The preview of the media gallery includes a snapshot of the media gallery at the time of sharing. The snapshot of the media gallery may include one or more animated images. An animated image may be a collection of images ordered in sequence in order to create an illusion of movement. In response to detecting activation of the message (e.g., via tapping or clicking on the message), the media gallery management system composes the media gallery on the second device based on the URL and the metadata associated with the media gallery. The URL may correspond to a web page that includes one or more background images (e.g., animated images or static images), one or more user avatar images, and one or more layers applied to the media gallery. In various embodiments, the web page is associated with a media gallery format that allows animation to be created and displayed inside of the web page. In various embodiments, the media gallery management system causes a display of the media gallery on the recipient user's device. As a result of the identifiers of the one or more user avatars being included in the metadata and provided to the recipient user's device, the shared media gallery is able to show the same one or more user avatars that appear in the original media gallery at the time of the sharing.

In various embodiments, the media gallery management system receives one or more text inputs via a text input region (or text input display region) in a user interface of the sending user's device (e.g., the first device). The media gallery management system transmits the one or more text inputs along with the message (or as a part of the message) to a recipient user's device (e.g., the second device). In various embodiments, the message associated with a shared media gallery is an ephemeral message.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagrammatic representation of a networked environment 100 in which the present disclosure may be deployed, in accordance with some examples. The networked environment 100 includes multiple instances of a client device 102, each of which hosts a number of applications, including a messaging client application 104 and other applications 106. Each messaging client application 104 is communicatively coupled to other instances of the messaging client application 104 (e.g., hosted on respective other client devices 102), a messaging server system 108, and third-party servers 110 via a network 112 (e.g., the Internet). A messaging client application 104 can also communicate with locally hosted applications 106 using Applications Program Interfaces (APIs).

A messaging client application 104 is able to communicate and exchange data with other messaging client applications 104 and with the messaging server system 108 via the network 112. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via network 112 to a particular messaging client application 104. While certain functions of the networked environment 100 are described herein as being performed by either a messaging client application 104 or by the messaging server system 108, the location of certain functionality either within the messaging client application 104 or the messaging server system 108 may be a design choice. For example, it may be a technical design choice to initially deploy certain technology and functionality within the messaging server system 108 but later migrate this technology and functionality to the messaging client application 104 where a client device 102 has sufficient processing capacity.

The messaging server system 108 supports various services and operations that are provided to the messaging client application 104. Such operations include transmitting data to, receiving data from, and processing data generated by the messaging client application 104. This data may include message content, media gallery content, client device information, geolocation information, media augmentation and overlays, message content persistence conditions, social network information, and live event information, as examples. Data exchanges within the networked environment 100 are invoked and controlled through functions available via user interfaces (UTs) of the messaging client application 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client application 104 in order to invoke functionality of the application servers 114. The Application Program Interface (API) server 116 exposes various functions supported by the application servers 114, including account registration, login functionality, the sending of messages, via the application servers 114, from a particular messaging client application 104 to another messaging client application 104, the sending of media files (e.g., media galleries, images, audio, or video) from a messaging client application 104 to a messaging server 118, and for possible access by another messaging client application 104, the settings of collections of media content items (e.g., media galleries), the retrieval of a list of friends of a user of a client device 102, the retrieval of such collections (including URLs associated with such collections), the retrieval of messages and content, the addition and deletion of entities (e.g., friends) to an entity graph (e.g., a social graph), the location of friends within a social graph, and opening an application event (e.g., relating to the messaging client application 104).

The application servers 114 host a number of server applications and subsystems, including, for example, a messaging server 118, an image processing server 122, a social network server 124, and a media gallery management system 130. The messaging server 118 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of media content items (also referred to as media galleries). These collections are then made available to the messaging client application 104 and can be shared with other users. Other processor and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
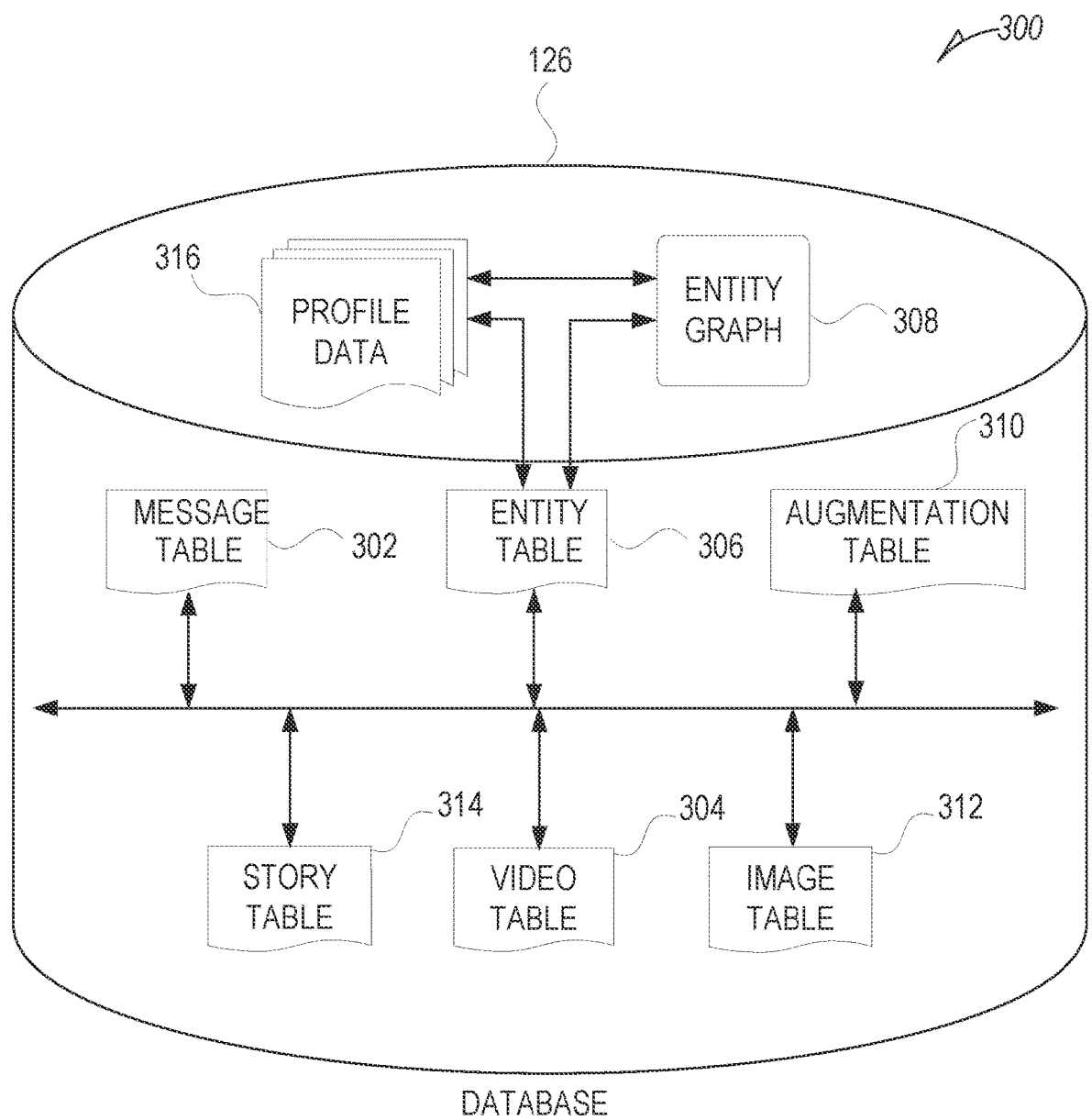
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the networked environment 100 with which a particular user has relationships, including bidirectional relationships (e.g., friend relationship) or unidirectional relationships (e.g., "following" another user). The social network server 124 is also configured to identify users and interests of users.

The media gallery management system 130 provides functions for sharing and managing media galleries, particularly avatar media galleries, as described herein. For example, in response to receiving a request to share a media gallery, the media gallery management system 130 generates (or determines) one or more user avatar identifiers that correspond to the one or more user avatars in the original media gallery. The media gallery management system 130 includes the one or more user avatar identifiers in metadata associated with the media gallery, and transmits the metadata of the media gallery along with the shared media gallery (via a uniform resource locator associated with the media gallery, for example) to a device of the recipient user. Thereby, when received by the recipient user, the shared media gallery shows (or includes) the one or more user avatars that appear in the original media gallery at the time of the sharing.

In various embodiments, features and functions of an external resource (e.g., an application 106 or applet) are made available to a user via an interface of the messaging client application 104. In this context, "external" refers to the fact that the application 106 or applet is external to the messaging client application 104. The external resource is often provided by a third party but may also be provided by the creator or provider of the messaging client application 104. The messaging client application 104 receives a user selection of an option to launch or access features of such an external resource. In response to receiving the user selection, the messaging client application 104 determines whether the selected external resource is a web-based external resource or a locally-installed application 106. In some cases, applications 106 that are locally installed on the client device 102 can be launched independently of and separately from the messaging client application 104, such as by selecting an icon, corresponding to the application 106, on a home screen of the client device 102.

In response to determining that the external resource is a locally-installed application 106, the messaging client application 104 instructs the client device 102 to launch the external resource by executing locally-stored code corresponding to the external resource. In response to determining that the external resource is a web-based resource, the messaging client application 104 communicates with the third-party servers 110 (for example) to obtain a markup-language document corresponding to the selected external resource. The messaging client application 104 then processes the obtained markup-language document to present the web-based external resource within a user interface of the messaging client application 104.

Figure 2:
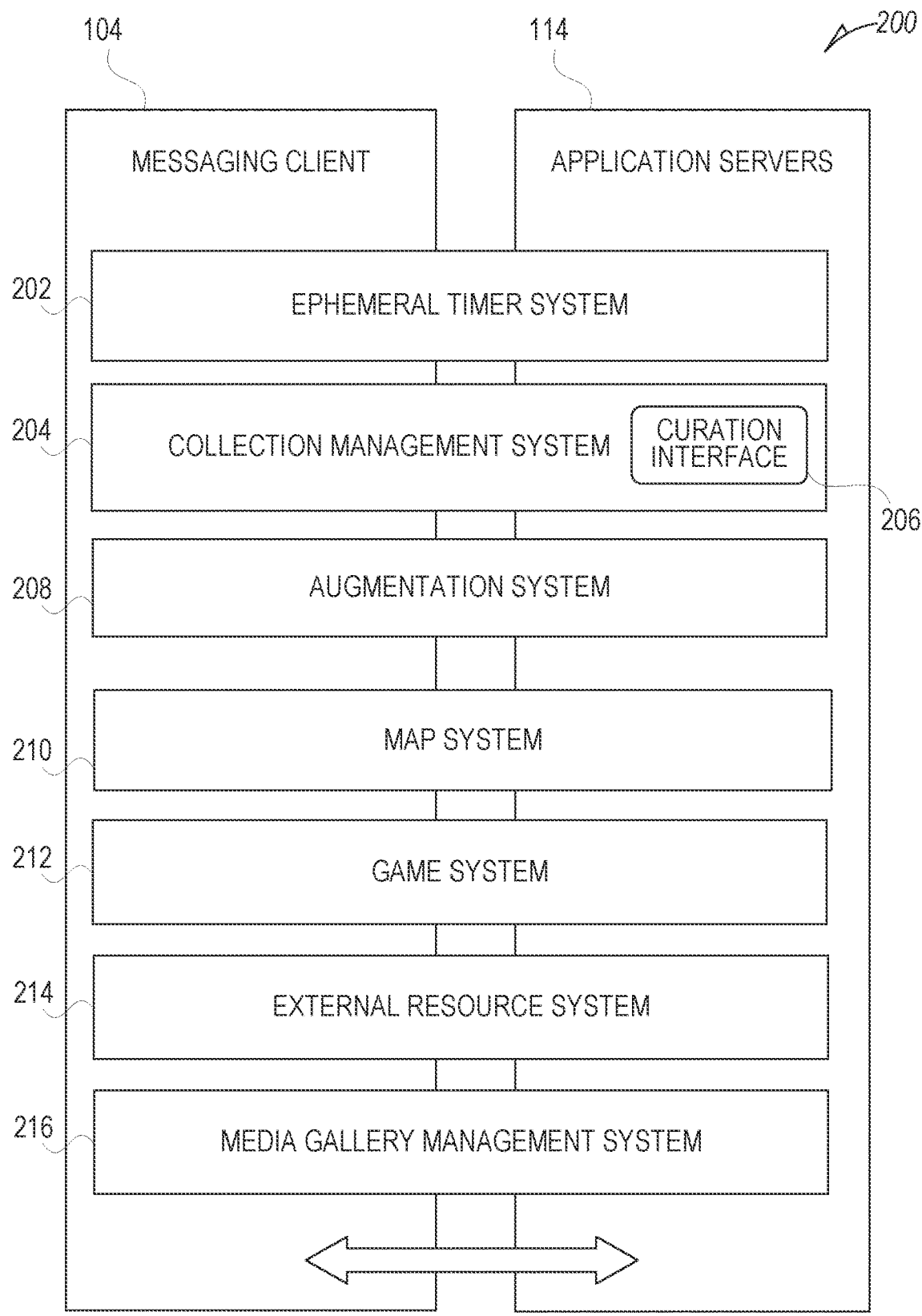
FIG. 2 is a diagrammatic representation of a messaging system, in accordance with some examples, that has both client-side and server-side functionality.

FIG. 2 is a block diagram 200 illustrating further details regarding the networked environment 100, according to some examples. Specifically, the networked environment 100 is shown to comprise the messaging client application 104 and the application servers 114. The networked environment 100 embodies a number of subsystems, which are supported on the client-side by the messaging client application 104 and on the sever-side by the application servers 114. These subsystems include, for example, an ephemeral timer system 202, a collection management system 204, an augmentation system 208, a map system 210, a game system 212, an external resource system 214, and a media gallery management system 216.

The ephemeral timer system 202 is responsible for enforcing the temporary or time-limited access to content by the messaging client application 104 and the messaging server 118. The ephemeral timer system 202 incorporates a number of timers that, based on duration and display parameters associated with a message, or a collection of media content items (e.g., a media gallery), selectively enable access (e.g., for presentation and display) to messages and associated content via the messaging client application 104. Further details regarding the operation of the ephemeral timer system 202 are provided below. In various embodiments, messages generated for sharing media galleries may be ephemeral messages.

The collection management system 204 is responsible for managing sets or collections of media content items. A media content item may be text, image, video, or audio data. A collection of media content items may be organized as a media gallery. Such a collection may be made available for a specified time period, such as the duration of an event to which the media gallery relates. For example, a media gallery relating to a music concert may be made available as a media gallery for the duration of that music concert. The collection management system 204 may also be responsible for publishing an icon that provides notification of the existence of a particular collection to the user interface of the messaging client application 104. In various embodiments, the media gallery management system 216 may reside within the collection management system 204, or communicates with the collection management system 204 to jointly manage avatar media galleries, as described herein.

The collection management system 204 furthermore includes a curation interface 206 that allows a collection manager to manage and curate a particular collection of media content items. For example, the curation interface 206 enables an event organizer to curate a collection relating to a specific event (e.g., delete inappropriate content items or redundant messages). Additionally, the collection management system 204 employs machine vision (or image recognition technology) and content rules to automatically curate a collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content items associated with a message or a media gallery. For example, the augmentation system 208 provides functions related to the generation and publishing of overlays (e.g., media overlays) for messages processed by the networked environment 100. For example, the augmentation system 208 operatively supplies a media overlay or augmentation (e.g., an image filter) to the messaging client application 104 based on a geolocation of the client device 102. In another example, the augmentation system 208 operatively supplies a media overlay to the messaging client application 104 based on other information, such as social network information of the user of the client device 102. A media overlay may include audio and visual content and visual effects. Content and content item is used interchangeably, as described herein. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120. Various functions provided for messages by the augmentation system 208 may also apply to media galleries.

In various embodiments, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

The map system 210 provides various geographic location functions, and supports the presentation of map-based media content and messages by the messaging client application 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the networked environment 100 from a specific geographic location may be displayed within the context of a map at that particular location to "friends" of a specific user on a map interface of the messaging client application 104. A user can furthermore share his or her location and status information (e.g., using an appropriate status avatar) with other users of the networked environment 100 via the messaging client application 104, with this location and status information being similarly displayed within the context of a map interface of the messaging client application 104 to selected users.

The game system 212 provides various gaming functions within the context of the messaging client application 104. The messaging client application 104 provides a game interface providing a list of available games that can be launched by a user within the context of the messaging client application 104, and played with other users of the networked environment 100. The networked environment 100 further enables a particular user to invite other users to participate in the play of a specific game, by issuing invitations to such other users from the messaging client application 104. The messaging client application 104 also supports both the voice and text messaging (e.g., chats) within the context of gameplay, provides a leaderboard for the games, and also supports the provision of in-game rewards (e.g., coins and items).

The external resource system 214 provides an interface for the messaging client application 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client application 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In order to integrate the functions of the SDK into the web-based resource, the SDK is downloaded by a third-party server 110 from the messaging server 118 or is otherwise received by the third-party server 110.

The messaging client application 104 presents a graphical user interface (e.g., a landing page or title screen) for an external resource. During, before, or after presenting the landing page or title screen, the messaging client application 104 determines whether the launched external resource has been previously authorized to access user data of the messaging client application 104. In response to determining that the launched external resource has been previously authorized to access user data of the messaging client application 104, the messaging client application 104 presents another graphical user interface of the external resource that includes functions and features of the external resource. The messaging client application 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The media gallery management system 216 provides functions including sharing and managing media galleries, particularly media galleries that include user avatars. Specifically, in response to receiving a request to share an avatar media gallery, a media gallery management system generates (or determines) one or more user avatar identifiers that correspond to the one or more user avatars in the original avatar media gallery. The media gallery management system includes the one or more user avatar identifiers in metadata associated with the avatar media gallery, and transmits the metadata of the avatar media gallery along with the shared avatar media gallery (via a uniform resource locator associated with the avatar media gallery, for example) to a device of the recipient user. Thereby, when received by the recipient user, the shared avatar media gallery shows (or includes) the one or more user avatars that appear in the original avatar media gallery at the time of the sharing. In various embodiments, the default user avatars in an avatar media gallery may include a user avatar representing a user of the displaying device and a user avatar representing a connected user (e.g., a friend) with whom the user most recently interacted. Such interactions may include transmitting messages, conducting video or audio calls, etc.

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the networked environment 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations (also referred to as avatars) within the content of messages communicated via the networked environment 100, and on map interfaces displayed by messaging client applications 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304), images (for which data is stored in an image table 312), and media galleries.

Filters, in some examples, are overlays that are displayed as overlaid on an image, a video, or a media gallery during a presentation to a recipient user. Filters may be of various types, including user-selected filters from a set of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102.

Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image, a video, or a media gallery.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on display at the same time.

A story table 314 stores data associated with collections of media content items (e.g., media galleries), including messages and the associated image, video, or audio data that are compiled into a collection (e.g., a gallery). The creation of a particular collection may be initiated by a particular user (e.g., each user for which a record is maintained in the entity table 306). A user may create a "personal story" or a personal media gallery in the form of a collection of media content items that can be shared with other users. To this end, the user interface of the messaging client application 104 may include an icon that is user-selectable to enable a sending user to add specific content to the personal media gallery.

Additionally, as disclosed herein, the story table 314 and associated collection may comprise the messages, programmatic scripts, templates, media data, and other parameters that permit the presentation of a dynamic parametrized media gallery to a user of client device 102.

As mentioned above, the video table 304 stores video data that, in some examples, is associated with messages for which records are maintained within the message table 302. Similarly, the image table 312 stores image data associated with messages for which message data is stored in entity table 306. The entity table 306 may associate various augmentations from the augmentation table 310 with various images and videos stored in the image table 312 and the video table 304.

Figure 4:
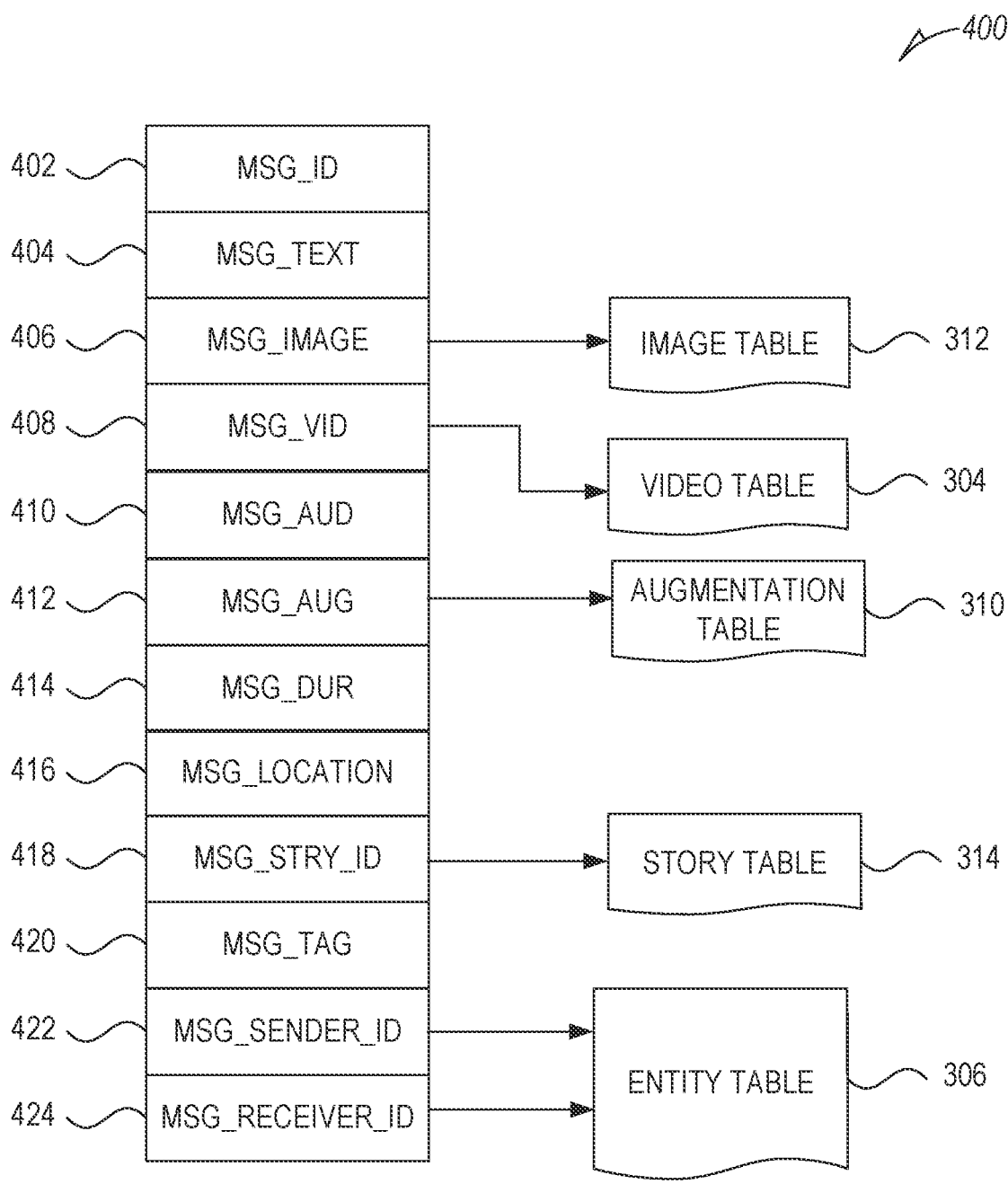
FIG. 4 is a diagrammatic representation of a message, in accordance with some examples.

FIG. 4 is a schematic diagram illustrating a structure of a message 400, according to some examples, generated by a messaging client application 104 for communication to a further messaging client application 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client application 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more collections (e.g., "stories" or media galleries identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 5:
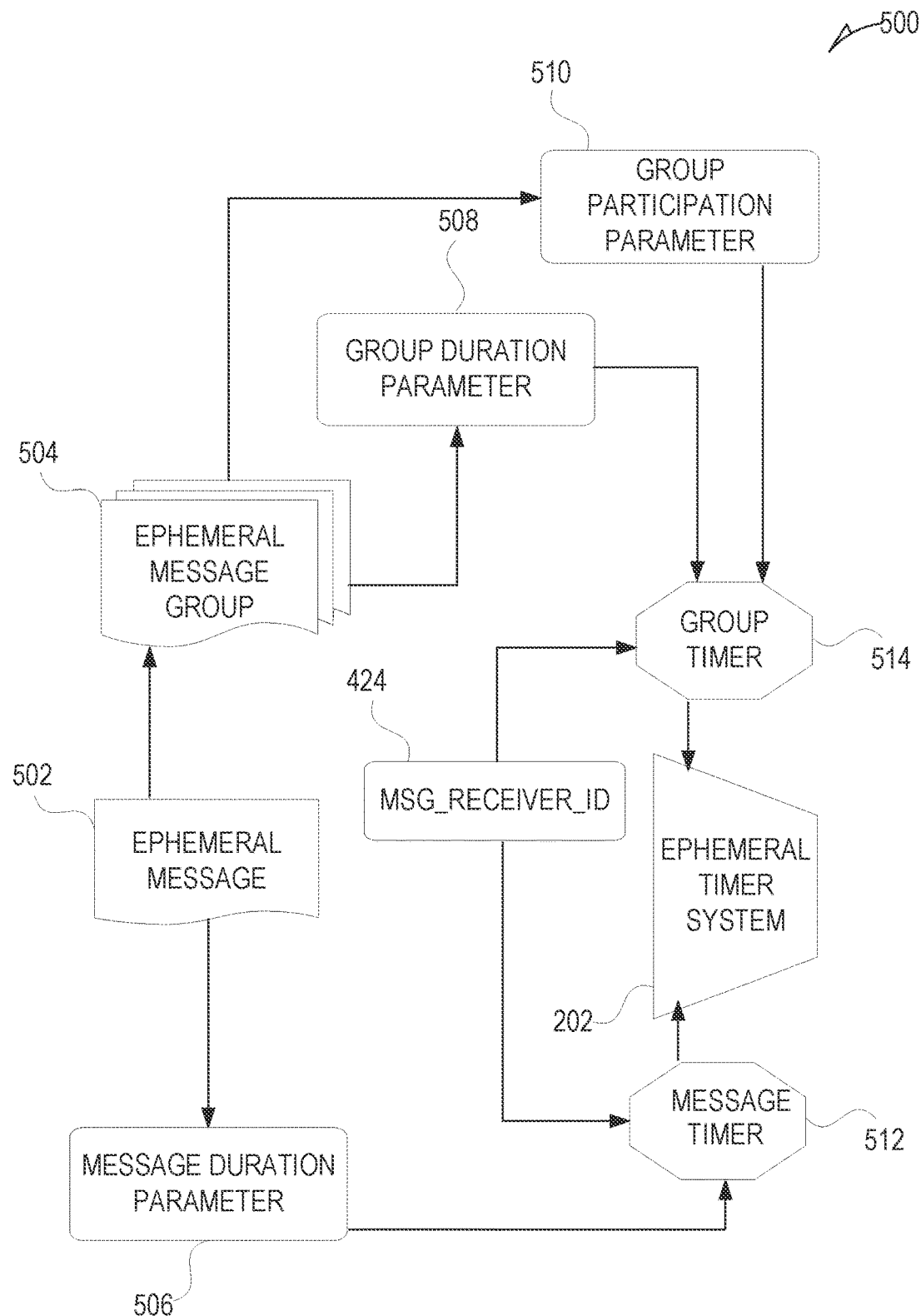
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines the amount of time that the ephemeral message 502 will be displayed to a receiving user of the ephemeral message 502 by the messaging client application 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the networked environment 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the networked environment 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
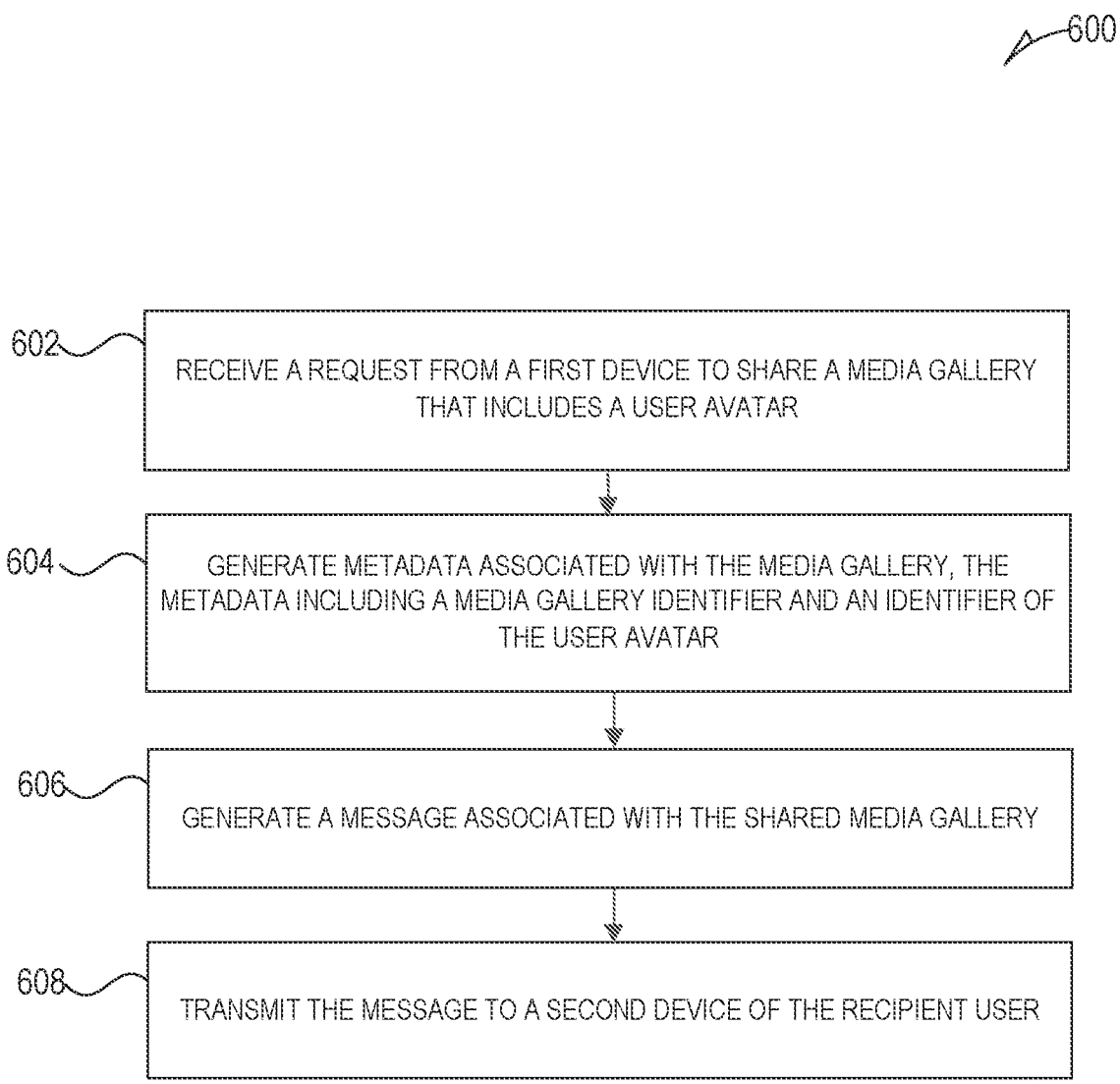
FIG. 6 is a flowchart illustrating an example method for sharing and managing media galleries, according to various embodiments of the present disclosure.

FIG. 6 is a flowchart illustrating an example method 600 for sharing and managing media galleries, according to various embodiments of the present disclosure. It will be understood that example methods described herein may be performed by a machine in accordance with some embodiments. For example, method 600 can be performed by the media gallery management system 130 described with respect to FIG. 1, the media gallery management system 216 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 600 may be represented by executable instructions that, when executed by a processor of a computing device, cause the computing device to perform the method 600. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 602, a processor receives a request from a device (e.g., the first device) to share a media gallery that includes one or more user avatars. A media gallery, also referred to as a collection of media content items, may include collections of text, image videos, and audio data. As noted above, an avatar media gallery corresponds to a media gallery that includes one or more user avatars. A user avatar may correspond to (or resemble) a real person (e.g., a user) or a fictional character. Various custom appearances of a user avatar may be generated based on the real-time data, and/or user inputs (e.g., user-specific parameters that represent the physical appearance of a person or a character. Various custom appearances of a user avatar may also be generated based on one or more media gallery templates (e.g., holiday-themed media gallery).

In various embodiments, the media gallery selected at the first device includes a collection of media content items that include a user avatar. The user avatar is selected based on the first device, or the user (or user account) associated with the first device.

Figure 9:
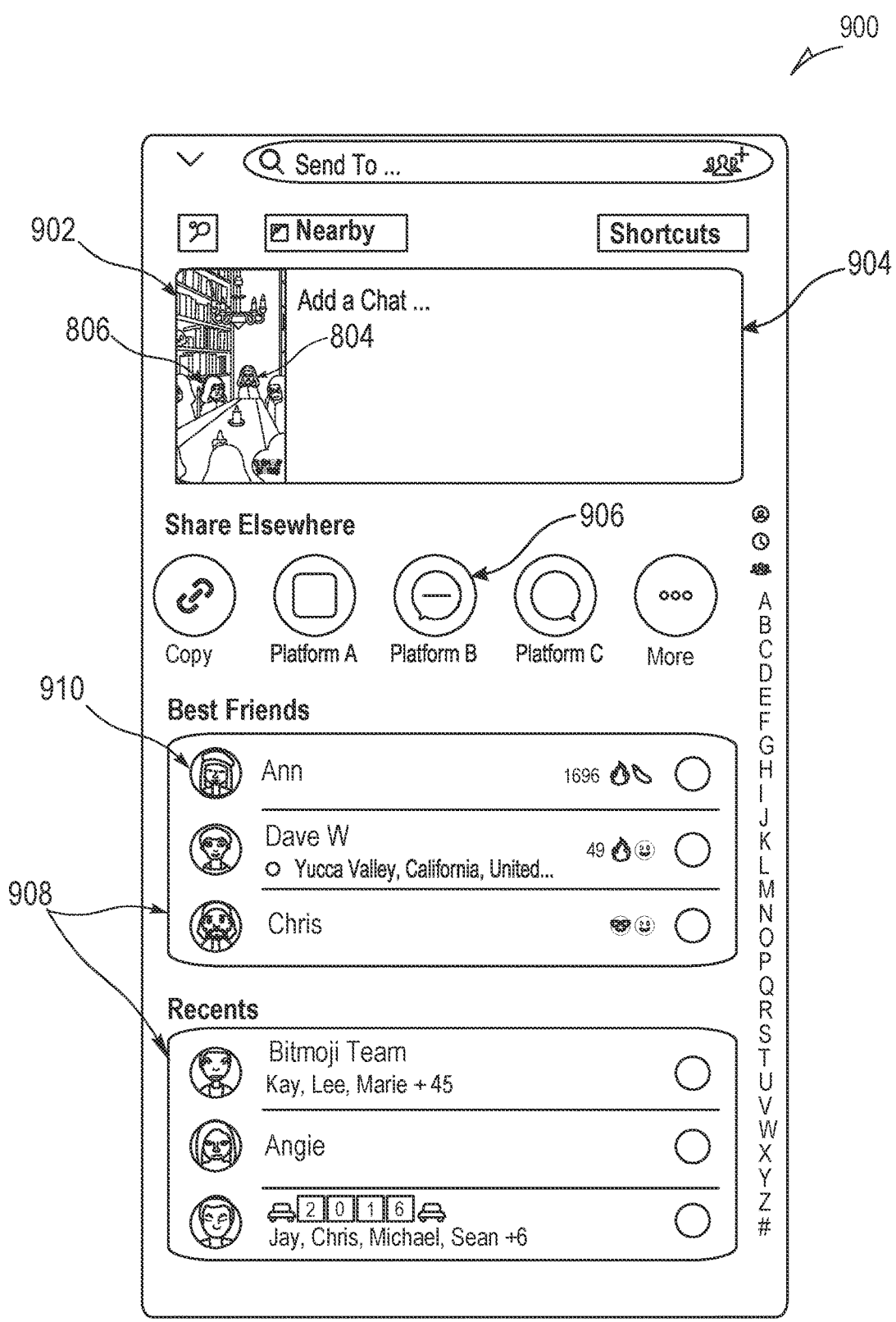
FIG. 9 illustrates an example graphical user interface generated by an example media gallery management system during operation, according to various embodiments of the present disclosure.

At operation 604, a processor generates a preview of the media gallery (e.g., the preview 902 of the media gallery, as illustrated in FIG. 9) and metadata associated with the media gallery. The metadata associated with the media gallery includes an identifier of the media gallery and one or more identifiers of the one or more user avatars. A preview of the media gallery may include a snapshot of the media gallery at the time of sharing. In various embodiments, the snapshot of the media gallery may include one or more animated images. An animated image may be a collection of images ordered in sequence in order to create an illusion of movement.

In various embodiments, a processor causes a display of a user interface on the first device. The user interface includes, as illustrated in FIG. 9, the preview 902 of the media gallery, a plurality of recipient users 908 for selection, a text input region 904, and one or more user-selectable icons (e.g., icon 906) that correspond to one or more third-party platforms. A user may share a media gallery on the one or more third-party platforms (e.g., Platforms A, B, and C, as illustrated in FIG. 9).

In various embodiments, in response to detecting a user selection of one or more recipient users and activation (e.g., via tapping or clicking) of a share button (not shown in FIG. 9) in the user interface, the media gallery management system fetches (or retrieves) data associated with the media gallery using the media gallery identifier. Data associated with the media gallery may be stored in a database communicatively coupled to the media gallery management system. The media gallery management system identifies a uniform resource locator (URL) associated with the media gallery based on the fetched data and/or the media gallery identifier. In various embodiments, a share button may be displayed after a user selects one or more of the recipient users 908, as illustrated in FIG. 9.

Figure 10:
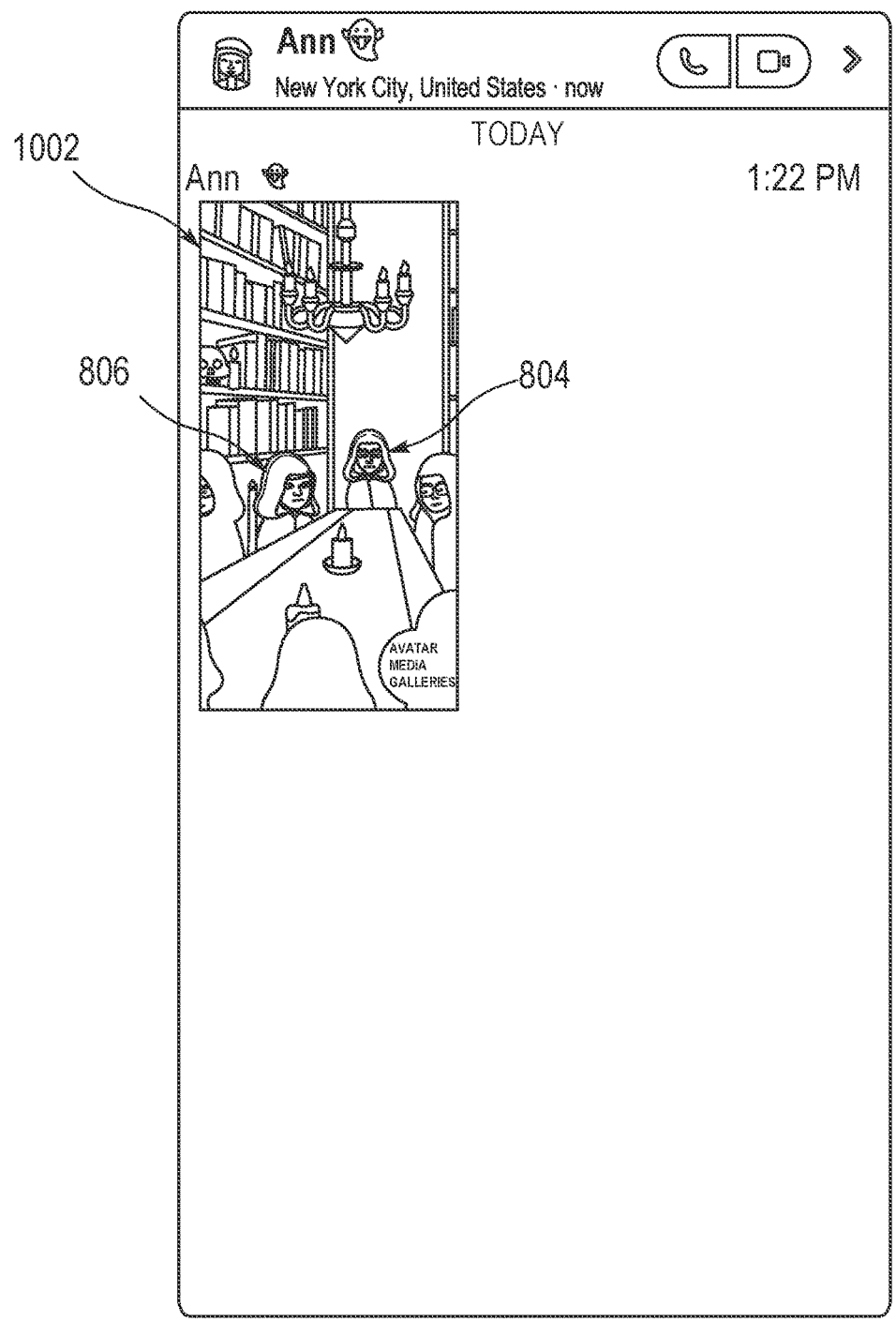
FIG. 10 illustrates an example graphical user interface generated by an example media gallery management system during operation, according to various embodiments of the present disclosure.

At operation 606, a processor generates a message (e.g., message 1002, as illustrated in FIG. 10) associated with the media gallery. The message at least includes the identified URL and the metadata associated with the media gallery.

At operation 608, a processor transmits the shared media gallery via the message to a device (e.g., the second device) of one or more recipient users, such as recipient users 908, as illustrated in FIG. 9.

In various embodiments, the message causes the second device (e.g., receiving device) to generate the media gallery that includes the user avatar selected based on the first device, or based on the user (or user account) associated with the first device.

Figure 7:
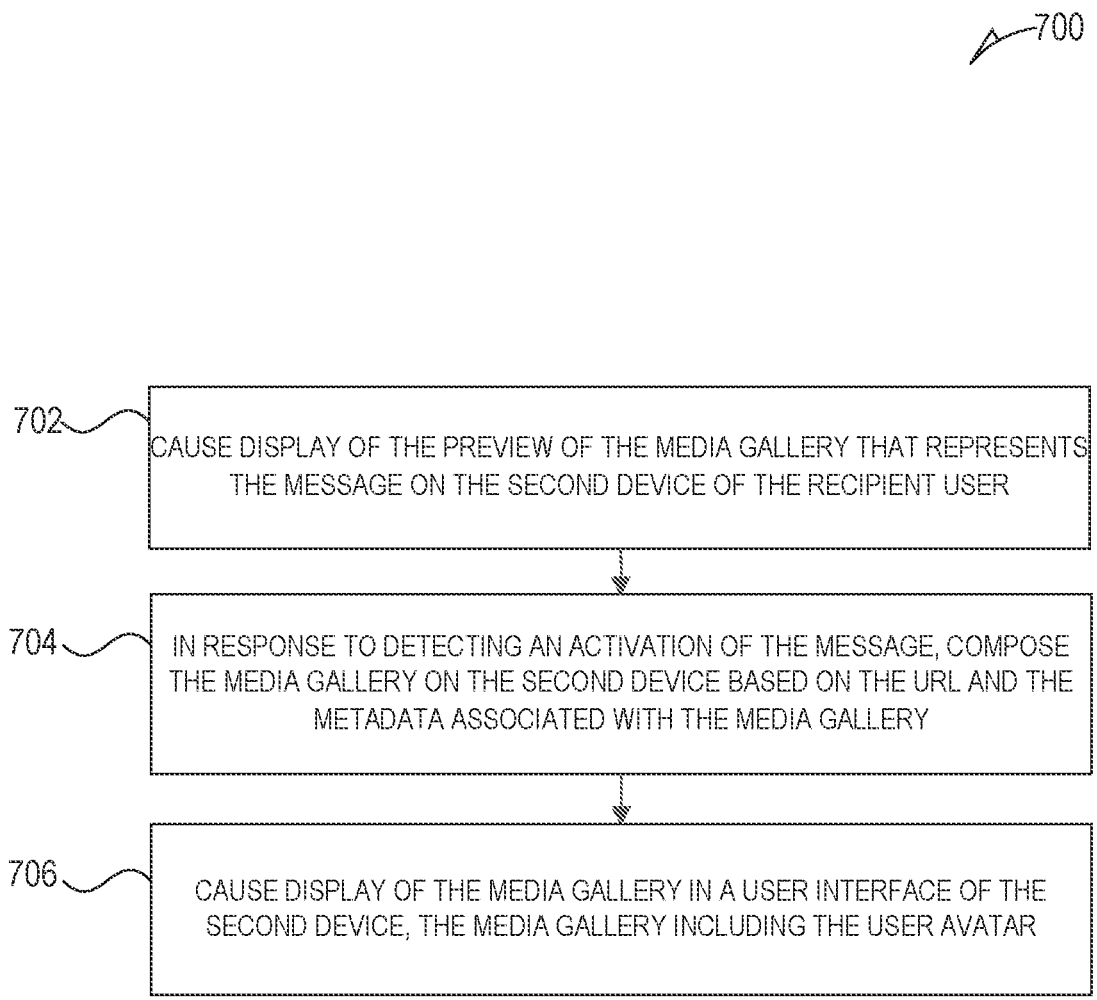
FIG. 7 is a flowchart illustrating an example method for sharing and managing media galleries, according to various embodiments of the present disclosure.

FIG. 7 is a flowchart illustrating an example method 700 for sharing and managing media galleries, according to various embodiments of the present disclosure. It will be understood that example methods described herein may be performed by a machine in accordance with some embodiments. For example, the method 700 can be performed by the media gallery management system 130 described with respect to FIG. 1, the media gallery management system 216 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 700 may be represented by executable instructions that, when executed by a processor of a computing device, cause the computing device to perform the method 700. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. In various embodiments, method 700 may be executed independently from method 600. In various embodiments, method 700 may be a subroutine of method 600 or any operations described therein.

At operation 702, a processor causes the display of the preview of the media gallery (e.g., preview 902 as illustrated in FIG. 9) that represents the message on the second device of the recipient user. The preview of the media gallery includes a snapshot of the media gallery at the time of sharing. The snapshot of the media gallery may include one or more animated images.

At operation 704, in response to detecting activation of the message (e.g., via tapping or clicking on the message), a processor composes (or generates) the media gallery on the second device based on the URL and the metadata associated with the media gallery. The URL may correspond to a web page that includes one or more background images (e.g., animated images or static images), one or more user avatar images, and one or more layers (or overlays) applied to the media gallery. In various embodiments, the web page is associated with a media gallery format that allows animation to be created and displayed inside of the web page.

At operation 706, a processor causes a display of the media gallery on the recipient user's device. As a result of the identifiers of the one or more user avatars being included in the metadata and provided to the recipient user's device, the shared media gallery is able to show the same one or more user avatars that appear in the original media gallery at the time of the sharing.

Figure 8:
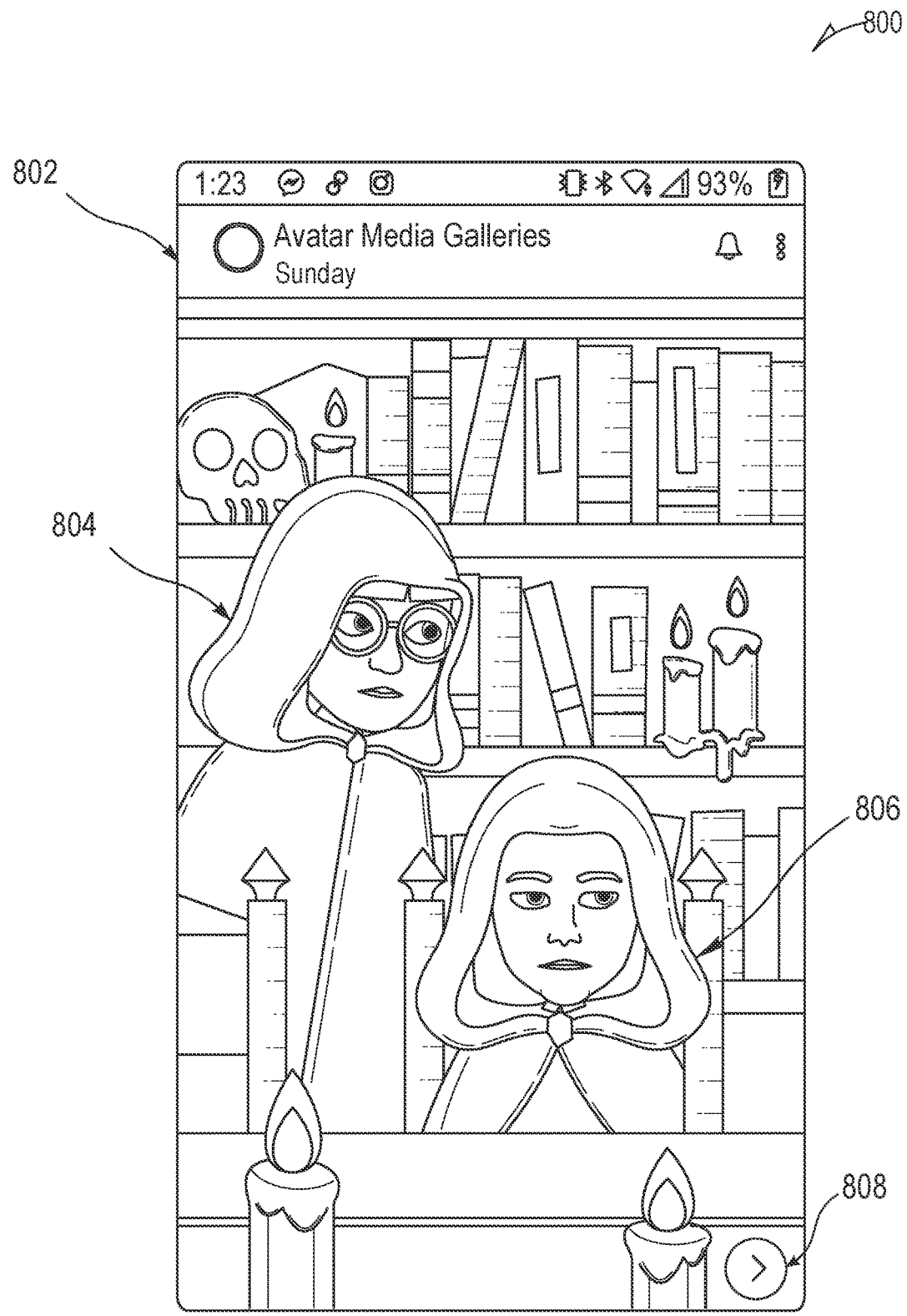
FIG. 8 illustrates an example graphical user interface generated by an example media gallery management system during operation, according to various embodiments of the present disclosure.

FIG. 8 illustrates an example graphical user interface 800 generated by an example media gallery management system during operation, according to various embodiments of the present disclosure. As shown in the user interface 800, an example avatar media gallery 802 includes two user avatars, user avatar 804 and user avatar 806. In various embodiments, user avatar 804 represents the user of the displaying device, and user avatar 806 represents the most recently messaged friend of the user. The user interface 800 also includes a share button that allows the user of the displaying device to share the example avatar media gallery 802 with another user (e.g., a recipient user).

FIG. 9 illustrates an example graphical user interface 900 generated by an example media gallery management system during operation, according to various embodiments of the present disclosure. The user interface 900 includes a preview 902 of the avatar media gallery 802. The image displayed in preview 902 may be an animated image that includes a collection of images organized in sequence to create a story. The preview 902 of the avatar media gallery 802 includes (or shows) user avatars 804 and 806. The user interface 900 further includes a plurality of recipient users 908 for selection, a text input region 904, and user-selectable icons (e.g., icon 906) corresponding to third-party platforms. A user may share a media gallery on any of the third-party platforms. Upon detecting a selection of a recipient user (e.g., user Ann 910), the media gallery management system may generate another share button (not shown, similar to icon 808) and causes the share button to be displayed in the user interface 900. A user may activate the share button (via tapping or clicking) to cause the shared media gallery to be transmitted to the selected recipient user(s) as a message.

FIG. 10 illustrates an example graphical user interface 1000 generated by an example media gallery management system during operation, according to various embodiments of the present disclosure. As shown, the user interface 1000 includes a message 1002 that is displayed as the preview of the shared avatar media gallery. The preview may be displayed as an animated image. The user interface 1000 may be generated and caused to be displayed on a recipient user's (e.g., Ann's) device. Upon activating the message (via tapping or clicking), the recipient user Ann may view the shared avatar media gallery that shows user avatars 804 and 806 in the original avatar media gallery at the time of the sharing. The message 1002 may be an ephemeral message.

Figure 11:
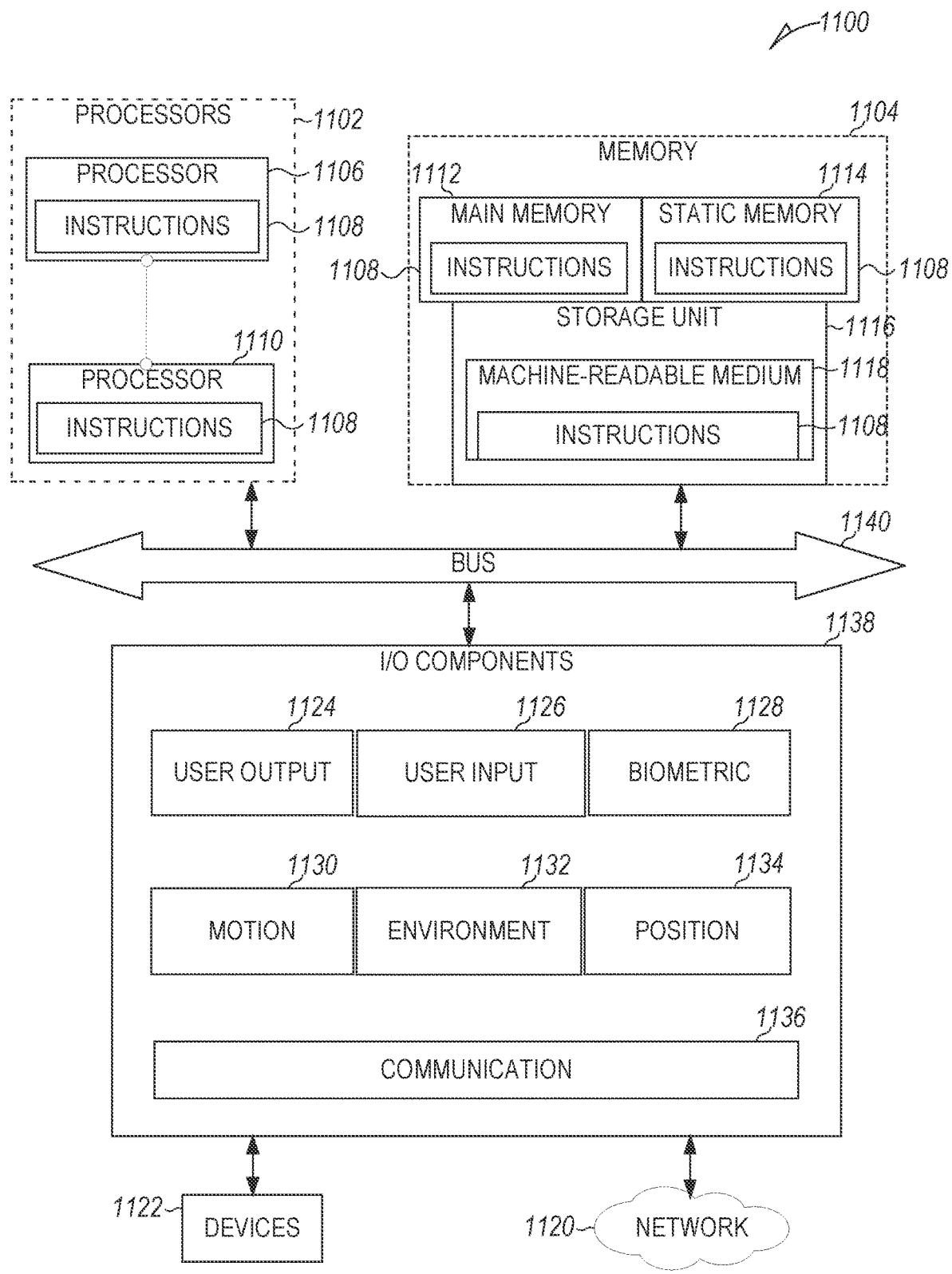
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In various embodiments, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output I/O components 1138, which may be programmed to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, both accessible to the processors 1102 via the bus 1140. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The VO components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen programmed to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
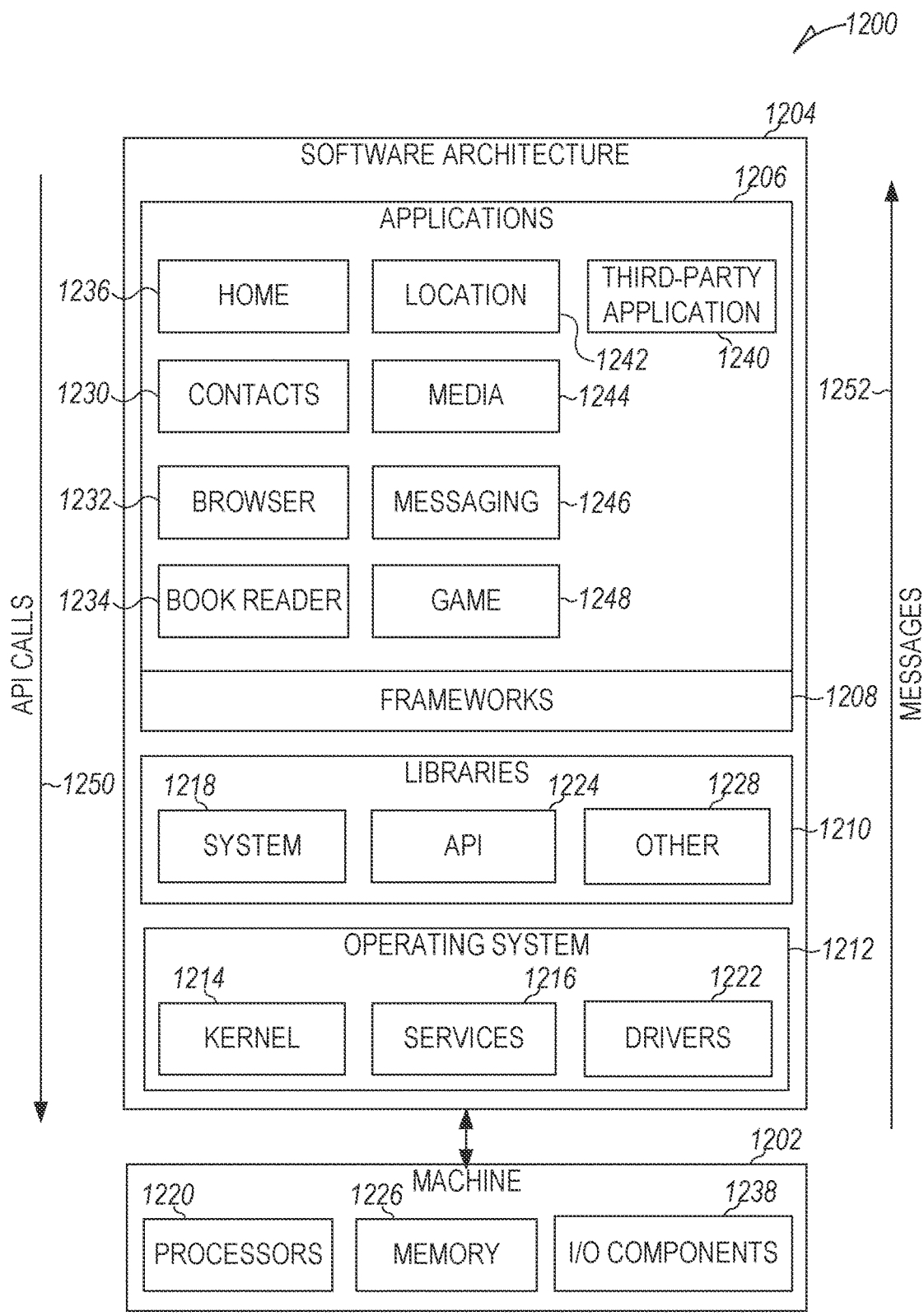
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the APT calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be programmed or arranged in a certain physical manner. In various embodiments, one or more computer systems (e.g., a standalone computer system, a client computer system, or a server computer system) or one or more hardware components of a computer system (e.g., a processor or a group of processors) may be programmed by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently programmed to perform certain operations. A hardware component may be a special-purpose processor, such as a field-programmable gate array (FPGA) or an application specific integrated circuit (ASIC). A hardware component may also include programmable logic or circuitry that is temporarily programmed by software to perform certain operations. For example, a hardware component may include software executed by a general-purpose processor or other programmable processor. Once programmed by such software, hardware components become specific machines (or specific components of a machine) uniquely tailored to perform the programmed functions and are no longer general-purpose processors. It will be appreciated that the decision to implement a hardware component mechanically, in dedicated and permanently programmed circuitry, or in temporarily programmed circuitry (e.g., programmed by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be programmed or instantiated at any one instance in time. For example, where a hardware component comprises a general-purpose processor programmed by software to become a special-purpose processor, the general-purpose processor may be programmed as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are programmed or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily programmed (e.g., by software) or permanently programmed to perform the relevant operations. Whether temporarily or permanently programmed, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some embodiments, the processors or processor-implemented components may be located in a single geographic location (e.g., within a home environment, an office environment, or a server farm). In other embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    receiving a request from a first device to share a media gallery with a recipient user, the media gallery having been generated at the first device and including a collection of media content items that include a user avatar, the user avatar having been selected based on the first device;
    generating, in response to receiving the request, metadata associated with the media gallery, the metadata including a media gallery identifier and an identifier of the user avatar;
    generating a message associated with the media gallery, the message at least including the media gallery identifier and the identifier of the user avatar; and
    transmitting the message to a second device of the recipient user, the message causing the second device to generate the media gallery including the collection of media content items that include the user avatar that was selected based on the first device.

2. The method of claim 1, further comprising:
    causing display of a user interface on the first device, the user interface including a preview of the media gallery and a plurality of recipient users for selection; and
    in response to detecting a selection of a recipient user from the plurality of recipient users and an activation of a share button included in the user interface, identifying a uniform resource locator (URL) associated with the media gallery based on the media gallery identifier.

3. The method of claim 2, wherein the preview of the media gallery includes a snapshot of the media gallery at a time of sharing, and wherein the snapshot of the media gallery includes an animated image.

4. The method of claim 2, wherein the URL corresponds to a web page that includes a background image, a user avatar image, and one or more layers applied to the media gallery.

5. The method of claim 2, further comprising:
causing display of the preview of the media gallery that represents the message on the second device of the recipient user;
in response to detecting an activation of the message, composing the media gallery on the second device based on the URL and the metadata associated with the media gallery; and
causing display of the media gallery in a user interface of the second device, the media gallery including the user avatar.

6. The method of claim 2, wherein the user interface includes a text input region and one or more user-selectable icons corresponding to one or more third-party platforms.

7. The method of claim 6, further comprising:
receiving a text input via the text input region in the user interface of the first device; and
transmitting the text input along with the message to the second device of the recipient user.

8. The method of claim 1, wherein the message is an ephemeral message.

9. The method of claim 1, wherein the collection of media content items comprises plural animated images and plural user avatars.

10. The method of claim 9, wherein the plural user avatars include the user avatar being a first user avatar that resembles a first user of the first device, and a second user avatar resembling a last user with whom the first user interacted.

11. A system comprising:
one or more processors; and
a non-transitory computer readable storage medium comprising instructions that when executed by the one or more processors cause the one or more processors to perform operations comprising:
receiving a request from a first device to share a media gallery with a recipient user, the media gallery having been generated at the first device and including a collection of media content items that include a user avatar, the user avatar having been selected based on the first device;
generating, in response to receiving the request, metadata associated with the media gallery, the metadata including a media gallery identifier and an identifier of the user avatar;
generating a message associated with the media gallery, the message at least including the media gallery identifier and the identifier of the user avatar; and
transmitting the message to a second device of the recipient user, the message causing the second device to generate the media gallery including the collection of media content items that include the user avatar that was selected based on the first device.

12. The system of claim 11, wherein the operations further comprise:
causing display of a user interface on the first device, the user interface including a preview of the media gallery and a plurality of recipient users for selection; and
in response to detecting a selection of a recipient user from the plurality of recipient users and an activation of a share button included in the user interface, identifying a uniform resource locator (URL) associated with the media gallery based on the media gallery identifier.

13. The system of claim 12, wherein the preview of the media gallery includes a snapshot of the media gallery at a time of sharing, and wherein the snapshot of the media gallery includes an animated image.

14. The system of claim 12, wherein the URL corresponds to a web page that includes a background image, a user avatar image, and one or more layers applied to the media gallery.

15. The system of claim 12, wherein the operations further comprise:
causing display of the preview of the media gallery that represents the message on the second device of the recipient user;
in response to detecting an activation of the message, composing the media gallery on the second device based on the URL and the metadata associated with the media gallery; and
causing display of the media gallery in a user interface of the second device, the media gallery including the user avatar.

16. The system of claim 12, wherein the user interface includes a text input region and one or more user-selectable icons corresponding to one or more third-party platforms.

17. The system of claim 16, wherein the operations further comprise:
receiving a text input via the text input region in the user interface of the first device; and
transmitting the text input along with the message to the second device of the recipient user.

18. The system of claim 11, wherein the message is an ephemeral message.

19. The system of claim 11, wherein the collection of media content items comprises plural animated images and plural user avatars, and wherein the plural user avatars include the user avatar being a first user avatar that resembles a first user of the first device, and a second user avatar resembling a last user with whom the first user interacted.

20. A machine-readable non-transitory storage medium having instruction data executable by a machine to cause the machine to perform operations comprising:
receiving a request from a first device to share a media gallery with a recipient user, the media gallery having been generated at the first device and including a collection of media content items that include a user avatar, the user avatar having been selected based on the first device;
generating, in response to receiving the request, metadata associated with the media gallery, the metadata including a media gallery identifier and an identifier of the user avatar;
generating a message associated with the media gallery, the message at least including the media gallery identifier and the identifier of the user avatar; and
transmitting the message to a second device of the recipient user, the message causing the second device to generate the media gallery including the collection of media content items that include the user avatar that was selected based on the first device.

* * * * *